United States Patent [19]
Scharf

[11] 3,801,451
[45] Apr. 2, 1974

[54] CERAMIC NUCLEAR FUEL OR BREEDER MATERIAL TABLETS AND METHOD OF PRODUCING THE SAME

[75] Inventor: Hans Scharf, Nurnberg, Germany

[73] Assignee: Siemens Aktiengesellschaft, Berlin, Germany

[22] Filed: Feb. 14, 1972

[21] Appl. No.: 226,298

Related U.S. Application Data
[63] Continuation of Ser. No. 885,692, Dec. 17, 1969, abandoned.

[30] Foreign Application Priority Data
Dec. 20, 1968 Germany............................ 1815957

[52] U.S. Cl....................... 176/73, 176/66, 176/74, 176/90
[51] Int. Cl............................. G21c 3/02, G21c 3/30
[58] Field of Search.............. 176/66, 73, 74, 90, 91

[56] References Cited
UNITED STATES PATENTS

| | | | |
|---|---|---|---|
| 3,140,983 | 7/1964 | Waine................... | 176/73 |
| 3,184,392 | 5/1965 | Blake.................. | 176/73 X |
| 3,192,621 | 7/1965 | Bauer et al. ......... | 176/73 X |
| 3,227,622 | 1/1966 | White .................... | 176/73 |
| 3,322,644 | 5/1967 | Benson .................. | 176/73 |
| 3,365,371 | 1/1968 | Lass et al........... | 176/74 X |
| 3,415,911 | 10/1968 | Lloyd................. | 176/73 X |
| 3,022,240 | 2/1962 | Bassett............... | 176/74 X |

FOREIGN PATENTS OR APPLICATIONS

| | | | |
|---|---|---|---|
| 958,697 | 5/1964 | Great Britain........ | 176/73 |
| 971,930 | 10/1964 | Great Britain........ | 176/74 |
| 884,969 | 12/1961 | Great Britain........ | 176/73 |
| 893,742 | 4/1962 | Great Britain........ | 176/90 |

*Primary Examiner*—Carl D. Quarforth
*Assistant Examiner*—Roger S. Galthier
*Attorney, Agent, or Firm*—Herbert L. Lerner

[57] ABSTRACT

Ceramic fissionable fuel or breeder material tablet axially alignable with corresponding tablets for forming nuclear reactor fuel rods includes a substantially cylindrical member having a depression at opposite end faces thereof, the end faces respectively comprising a marginal zone of slightly sloping conical shape having an angle of inclination within a range of 0.5° to 30°, the inclined marginal zone defining, with the remaining surface of the respective end face, an annular contact edge for contacting an end face of another tablet axially alignable therewith, the annular contact edge being spaced from the peripheral edge of the end face a given distance so that compression forces acting on the annular contact edge when the tablet is in use in a nuclear reactor fuel rod, are absorbable by a spatial region of the table having adequate strength for absorbing the compression forces.

6 Claims, 5 Drawing Figures

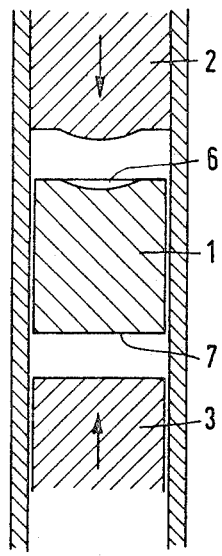
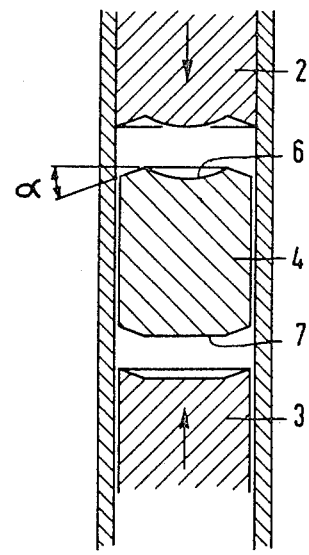
Fig.1  Fig.2
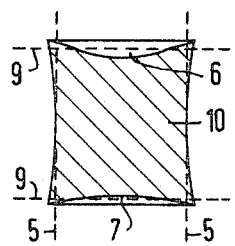
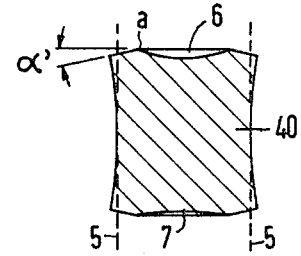
Fig.1a  Fig.2a
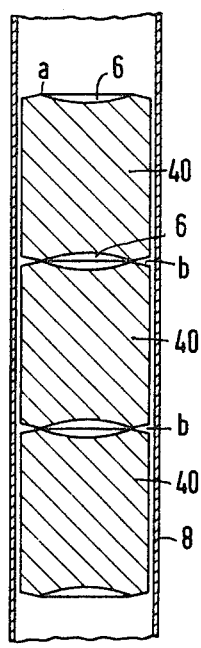
Fig.3

CERAMIC NUCLEAR FUEL OR BREEDER MATERIAL TABLETS AND METHOD OF PRODUCING THE SAME

This is a continuation, of application, Ser. No. 885,692, filed Dec. 17, 1969, now abandoned.

My invention relates to ceramic nuclear fissionable fuel or fissionable material tablet and more particularly to such tablet having a cylindrical form with dished end faces and which are used for the construction of nuclear reactor fuel rods.

A complete nuclear reactor fuel rod is formed of a tubular can or jacket consisting, for example of zirconium or steel, which surrounds a column or a series of axially aligned tablets consisting of fissionable fuel or breeder material. These tablest of predominantly ceramic, primarily oxide ceramic materials, are produced conventionally by the compression of suitable powders in a cylindrical mold. These pressed articles, so-called "green bodies" are then sintered and thereby attain the desired characteristics, for example, with respect to strength, density, porosity, etc. In the course of the sintering process, a volume reduction of about 15 to 20 percent of the original volume occurs.

Due to frictional conditions during the compression step and the inhomogeneities in density connected therewith, this volume reduction occurring during the sintering step does not take place equally and uniformly. Shaped members are produced rather whose original cylindrical outer surfaces have a similarity to a rotational hypeboloid and whose initially flat end faces are curved inwardly so as to be slightly concave. In this form, the tablets cannot be used however in many situations. They must first be given, by grinding operation, the desired cylindrical shape and nominal dimension. To absorb the very large thermal expansion of the central regions of the tablets during operation of the nuclear reactor within which they are located, the tablets are often provided with depressions, so-called "dishing" in the end faces thereof, which is previously effected during the compression step.

The sharp edges which are formed by the manufacturing step at the rims of the tablets are very pressure-sensitive which is especially disadvantageous when inserting the tablets into the tubular cans or jackets and even when only slightly bending the fuel rods. The edges of the ceramic material which often crack or rupture sporadically during the manufacturing steps not only disrupt the construction of the fissionable fuel columns but can also cause damage to the tubular can or jacket which, under certain conditions, is of very thin-walled construction. These phenomena can be readily explained in that only a point contact often occurs between the individual tablets so that the ultimate or breaking strength of the ceramic is exceeded by relatively small forces due to the point contact. To counteract this effect it has already been suggested that the fracture-sensitive edges of the tablets be blunted through grinding a marginal chamfer thereon. In addition to the rather expensive production process, this suggested measure does not lead to the desired result because the engagement or contact between tablets then only occurs in the direct vicinity of the margins of the tablets.

It is accordingly an object of my invention to provide ceramic nuclear fuel or breeder material tablets and method of producing the same which affords a considerable improvement in processability of the tablets without increasing the cost of manufacture thereof. More particularly, it is an object of my invention to provide such tablets which will be subject to minimal fracture.

With the foregoing and other objects in view, I provide in accordance with my invention ceramic fissionable fuel or breeder material tablet axially alignable with corresponding tablets for forming nuclear reactor fuel rods, comprising a substantially cylindrical member having a depression at opposite end faces thereof, the end faces respectively including a marginal zone of slightly sloping conical shape having an angle of inclination within a range of 0.5° to 30°, the inclined marginal zone defining, with the remaining surface of the respective end face, an annular contact edge for contacting an end face of another tablet axially alignable therewith, the annular contact edge being spaced from the peripheral edge of the end face a given distance so that compression forces acting on the annular contact edge, when the tablet is in use in a nuclear reactor fuel rod, are absorbable by a spatial region of the tablet having adequate strength for absorbing the compression forces. This means that in accordance with the strength of the tablets, which is dependent upon the type of material, the contacting edge is spaced from 0.5 to 2 mm from the peripheral surface of the tablet. This is not accompanied by any difficulties in the manufacture thereof because this inclination of the end faces can be produced by a suitably shaped compression die when compressing the tablet, the shape of the thus compressed body being such as to have the desird sloping conical shape with an angle of inclination within the range of 0.5° to 30° after contraction of the compressed body in a subsequent sintering step.

Other features which are considered as characteristic for the invention are set forth in the appended claims.

Although the invention is illustrated and described herein as embodied in ceramic nuclear fuel of breeder material tablets and method of producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a longitudinal sectional view of a heretofore known device for compressing a known tablet as a first stage in the formation thereof;

FIG. 1a is a sectional view of a heretofore known tablet produced by the known device of FIG. 1;

FIG. 2 is a view similar to that of FIG. 1 of a device for producing the tablet of the invention in the instant application;

FIG. 2a is a sectional view of the tablet of the instant invention; and

FIG. 3 is a fragmentary longitudinal sectional view of a fuel rod formed of tablets according to the invention.

Referring now to the drawing, and first particularly to FIG. 1 thereof, there is shown a known device for performing the compression step on a conventional nuclear fissionable fuel tablet 10 to be sintered. The tablet 10 is provided with a flat end face on one side thereof, and is provided with an impressed "dishing" at the end face on the other side thereof. According to FIG. 1, the tablet is initially formed as a "green body" by means of compression dies 2 and 3 shaped to produce the ultimate form of the tablet. FIG. 1a shows compressed tablet 1 of FIG. 1 after it has been subjected to a sintering step. Thus, the finished fuel tablet 10 of FIG. 1 produced by the known device and method is formed with a curvature both in the peripheral surface thereof as well as in the end face thereof which was originally formed with a flat surface in the compression step shown in FIG. 1. By subsequent grinding along the dotted lines 5 and 9 in FIG. 1a, the tablet produced by the known method and device must then be brought to the nominal dimension and the nominal shape, a process which is rather costly, especially for the end faces.

In contrast thereto, there is shown in FIG. 2 the method of production of a nuclear fissionable fuel or breeder material tablet according to the invention of the instant application. The compression dies 2 and 3 in FIG. 2 are shaped in such a manner that the marginal zone of the fissional fuel or breeder material tablet 4 is provided with an inclination. The angle of inclination is indicated by $\alpha$. After sintering and the subsequent contraction of the tablet 4 of FIG. 2, it assumes the shape of the tablet 40, shown in FIG. 2a. It is apparent therefrom that the angle $\alpha$ decreases in size to the value $\alpha'$. This is produced due to the contraction of the tablet in axial direction during the sintering step. Since the contraction displacement for the particular material is virtually uniform, the size of the angle $\alpha$ can be adjusted in the compression tool or die so that the desired inclination is produced in the final workpiece. The grinding operation only along the lines 5, as shown in FIG. 2a, is then necessary to provide the tablet 40 with an accurate cylindrical outer dimension. From FIG. 2 it is apparent that the flat bottom end surface 7 is provided with a slight depression similar to that of FIG. 1a, which however is not detrimental. Subsequent machining or processing on the end faces of the tablet 40 according to FIG. 2a is unnecessary.

FIG. 3 shows a fragmentary longitudinal section of a nuclear fuel rod. The fuel or breeder material tablets 40 which lie closely one on top of the other are surrounded by a tubular can or jacket 8. The size of the angle $\alpha'$ is only minimal and is not to be compared with the chamfering of the edges, as has been performed heretofore. It is essential that the contact lines $a$ between the individual tablets 40 of a fuel or breeder material column within a fuel rod are located at such a distance from the marginal zones proper thereof that the compressive forces which can obviously also occur thereat can be absorbed by a spatial region of the tablet having adequate strength, and can thereby prevent a fracture of the tablet. The radial gaps $b$ thereby formed in a column of fuel or breeder material tablets 40 are very small. The are normally in the order of magnitude of up to several tenths of a millimeter. The respective gaps $b$ must be kept very small, for example, if the thickness of the tubular can wall 8 is very small, so that no part of the tubular can material can become deformed within these gaps $b$ due to the outer pressure of coolant circulating around the fuel rod. Obviously, it can also be conversely desirable to provide somewhat larger gaps $b$ so as to produce the deformation of the tubular can therewith, for example so as to provide a better grip for the tablets 40 within the tubular can 8. Due to the construction of such a conical inclination at the end faces of the tablet 40, the contact lines or the contact points $a$ of the tablets are shifted further radially inwardly so that considerably greater forces are necessary to be applied before fracture will occur. Such tablets even under axial compressive stresses can be rotated with their end faces opposite to one another without detrimental consequences. Rejects which are formed normally in the conventional handling of tablet columns, for example in the grinding operation, in packaging or transporting and the further machining or processing of formed fuel rods, are thus considerably reduced thereby, since virtually no splitting of the edges occurs any more during insertion of columns of the fuel or breeder material tablets into the tubular can or jacket according to the invention. Also when the finished fuel rods are subjected to bending stresses wherein the column of tablets is for the most part prestressed by a spring, a substantially stable behavior of tablets is produced due to the increase of the resistance to fracture thereof at the further radially inwardly located contact edges $a$.

The new shape of the fissionable fuel or breeder material tablets 40 according to my invention, which can for example have a diameter of 5 to 20 mm and whose inclined rim has a width of about 0.5 to 2 mm depending upon the type of material, the strength the density and the like of the tablet, affords very great advantages both in manufacturing techniques as well as in the technical uses thereof, which have been confirmed by actual practice to the fullest extent.

The term "tablet" employed herein is often referred to in the art as "pellet" and is deemed to be synonymous therewith.

I claim:

1. Ceramic fissionable fuel or breeder material tablet axially alignable with corresponding tablets for forming nuclear reactor fuel rods, comprising a substantially cylindrical member having a depression at opposite end faces thereof, said end faces respectively including a marginal zone of slight sloping obtusely conical shape, the slope having an angle of inclination from the horizontal from a minimum of 0.5 up to a maximum of 30° extending and sloping radially outwardly from the outer edge of said depression, said obtusely inclined marginal zone defining with said outer edge of said depression an annular line-like contact edge for contacting an end face of another tablet axially alignable therewith, said annular line-like contact edge forming the apex of said conical shape, being spaced from the peripheral edge of said end face a distance of the order of 10 percent of the diameter of the tablet so that compression forces acting on said annular line-like contact edge, when the tablet is in use in a nuclear fuel rod, are absorbable by a spatial region of the tablet having adequate strength for absorbing said forces, and whereby any planar annular portion on said end face are avoided.

2. Tablet according to claim 1, wherein said depression has a flat base.

3. Tablet according to claim 1, wherein said depression has a concave base.

4. Tablet according to claim 1, wherein said annular contact edge is formed with an obtuse-angled cross section.

5. Tablet according to claim 1, wherein said annular contact edge is formed with a substantially circular cross section.

6. Tablet according to claim 1, wherein said annular contact edge is spaced about 0.5 to 2 mm from said peripheral edge of said end face.

* * * * *